United States Patent
Sander et al.

(10) Patent No.: US 12,466,128 B2
(45) Date of Patent: Nov. 11, 2025

(54) ADDITIVELY MANUFACTURED STRUCTURE AND METHOD OF MANUFACTURING THE SAME

(71) Applicant: HENSOLDT Sensors GmbH, Taufkirchen (DE)

(72) Inventors: Jörg Sander, Ulm (DE); Rolf Baltes, Munich (DE); Andreas Salomon, Munich (DE); Felix Zimmer, Erding (DE); Tobias Hehn, Oberthulba (DE)

(73) Assignee: HENSOLDT Sensors GmbH, Taufkirchen (DE)

( * ) Notice: Subject to any disclaimer, the term of this patent is extended or adjusted under 35 U.S.C. 154(b) by 0 days.

(21) Appl. No.: 17/708,526

(22) Filed: Mar. 30, 2022

(65) Prior Publication Data

US 2022/0314536 A1    Oct. 6, 2022

(30) Foreign Application Priority Data

Mar. 31, 2021 (EP) .................................... 21166339

(51) Int. Cl.

| | |
|---|---|
| *B29C 64/194* | (2017.01) |
| *B29C 64/393* | (2017.01) |
| *H05K 1/02* | (2006.01) |
| *B29L 31/34* | (2006.01) |
| *B33Y 10/00* | (2015.01) |
| *B33Y 30/00* | (2015.01) |
| *B33Y 40/00* | (2020.01) |
| *B33Y 50/02* | (2015.01) |
| *B33Y 80/00* | (2015.01) |

(52) U.S. Cl.
CPC .......... *B29C 64/194* (2017.08); *B29C 64/393* (2017.08); *H05K 1/0269* (2013.01); *B29L 2031/3425* (2013.01); *B33Y 10/00* (2014.12); *B33Y 30/00* (2014.12); *B33Y 40/00* (2014.12); *B33Y 50/02* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 2005/0074954 A1* | 4/2005 | Yamanaka | ........ H01L 27/14837 257/E27.155 |
| 2016/0037637 A1* | 2/2016 | Carlson | ................ H05K 3/4638 174/266 |

(Continued)

FOREIGN PATENT DOCUMENTS

| | | |
|---|---|---|
| CN | 105813382 A | 7/2016 |
| JP | H0232594 A | 2/1990 |
| JP | H04122842 A | 4/1992 |

OTHER PUBLICATIONS

Extended European Search Report, Application No. 21166339.8, dated Sep. 28, 2021, 8 pages.

*Primary Examiner* — Feifei Yeung Lopez
(74) *Attorney, Agent, or Firm* — Mahamedi IP Law LLP

(57) ABSTRACT

A structure comprises: a plurality of substructures and a vernier-based position marker. The plurality of substructures include a first substructure, a second substructure, and at least one electronic component. The second substructure is at least partially additively manufactured on the first substructure. The vernier-based position marker is configured to indicate a relative offset between the first substructure and the second substructure.

8 Claims, 7 Drawing Sheets

(56) References Cited

U.S. PATENT DOCUMENTS

| | | | |
|---|---|---|---|
| 2016/0198576 A1* | 7/2016 | Lewis | B29C 64/106 |
| | | | 361/761 |
| 2017/0062387 A1* | 3/2017 | Hong | H01L 25/0657 |
| 2017/0179607 A1 | 6/2017 | Ziegler et al. | |
| 2018/0274908 A1* | 9/2018 | Nakayama | B32B 27/308 |
| 2018/0348492 A1* | 12/2018 | Pavlov | B29C 64/393 |
| 2019/0134892 A1 | 5/2019 | Mamrak et al. | |
| 2020/0006266 A1* | 1/2020 | Chen | H01L 23/5283 |
| 2020/0126881 A1* | 4/2020 | Liao | H01L 23/49822 |

* cited by examiner

ADDITIVELY MANUFACTURED STRUCTURE AND METHOD OF MANUFACTURING THE SAME

TECHNICAL FIELD

The present invention relates to an additively manufactured structure and to a method of manufacturing the same, and more particularly to a position marker for additively manufactured two-part or multi-part structures for additively manufactured electronics.

BACKGROUND

For additively manufactured electronics, a printing system based on the multi-jet process can be used, in which at least two inks are processed. In the minimum configuration, one of the two inks is a non-conductive ink, while the other ink is electrically conductive and comprises conductive nanoparticles that are sintered into conductive tracks in the printing process. In order to be able to apply electronic components or devices (microcontrollers, resistors, capacitors, etc.) to an additively manufactured board, the electronic components are placed on the board using a pick-and-place process, and soldered.

For such printers, installation spaces for circuit boards of, for example, 160 mm×160 mm×3 mm can be achieved, although there is also a desire to realize greater heights in order to be able to exploit the advantages of three-dimensional (3D) construction. In particular, there is a need for boards that are no longer just planar in design, but can also be designed three-dimensionally for any desired or required form factor. This enables higher integration densities, shielding, electromechanical keys, spy protection mechanisms and much more.

With conventional processes, components can only be placed on the top and bottom of the board. In order to get components within circuit carriers (e.g. within a cube), initially a first substructure is printed, which contains corresponding pockets for the required components. The printing process is interrupted for assembly, and then continued after assembly. At present, this assembly can only take place outside the printer, which means that the board including the build platform is removed from the printer before assembly and then reinserted after assembly. After reinsertion, it is important that the printer continues printing very precisely on the previous first substructure. This is the only way to ensure that the contact connections overlap to a sufficient extent and that sufficiently good through-hole plating is possible in the vertical build direction (Z direction).

This "job-on-job" precision can currently be checked only by very time-consuming and costly computer tomography examinations following the 3D printing. Therefore, a disadvantage in conventional printing is the large technical and temporal effort required for this type of quality control. Moreover, this quality control can only be performed after the printing process. Should any adjustment be required, this is not possible during the printing process.

There is thus a need for alternative procedures by which the mentioned job-on-job precision could be checked with significantly less effort. There is also a need for possibilities to perform a quick and simple 100% quality assurance of the job-on-job precision by means of optical systems or even the human eye.

BRIEF DESCRIPTION OF THE INVENTION

At least a part of the above problems is solved by an additively manufactured structure according to claim 1. The dependent claims relate to advantageous further embodiments of the objects of the independent claims.

The present invention relates to a structure comprising: a plurality of substructures; and a vernier-based position marker. The plurality of substructures includes a first substructure, a second substructure, and at least one electronic component. The second substructure is additively manufactured at least in part on the first substructure. The vernier-based position marker is configured to indicate a relative offset between the first substructure and the second substructure.

In particular, the structure shall comprise an arbitrary component of 3D manufactured electronics, including e.g.: circuit boards for electronic components (active or passive), electrical connections, antennas, waveguides, etc.

According to embodiment, the additive manufacturing may use a printing system based on the multi-jet process, in which at least two inks are processed. One of the two inks may be a non-conductive ink, while the other ink is electrically conductive and comprises conductive nanoparticles that are sintered into conductive tracks in the printing process. Moreover, according to embodiments, electronic components are placed on a board using a pick-and-place process, and soldered. The additive manufacturing will embed the electronic component into the additively manufactured structure.

A vernier-based position marker shall be understood as indicating means based on the vernier principle to indicate an offset (or displacement/rotation). The vernier principle is based on two periodic structures (e.g. line scales or grids) with different periodicity in at least one direction. In the simplest case, as with a caliper gauge, there are two adjacent line scales (or division scale), one of which has a line spacing (periodicity) of 1 mm and the other of 0.9 mm. If the line scales have at least 10 lines, an offset of the two line scales can be detected to within 0.1 mm. This is only an example. The two scales can be scaled with respect to each other as desired.

In the context of the present invention, the term "offset" is intended to encompass not only linear displacement, but also rotations or combined motions.

The first substructure does not have to be additively manufactured; it can also be a finished circuit board or a conventional printed circuit board. Advantageously, however, the first vernier pattern is additively manufactured on it in order to achieve the most accurate positioning possible during the entire additive manufacturing process.

Optionally, the position marker comprises a first vernier pattern and a second vernier pattern, wherein the first vernier pattern is formed on the first substructure, and the second vernier pattern is formed on the second substructure or on a component of an additive manufacturing apparatus. The component may be, for example, the print head or a fixture or other part provided for positioning.

Optionally, the first vernier pattern is formed on an upper surface of the first substructure and the second vernier pattern is formed on a bottom surface of the second substructure, the bottom surface and the top surface facing each other. This can minimize parallax error.

Optionally, the first vernier pattern and/or the second vernier pattern each include a grid or at least one vernier scale in order to indicate an offset in one or both directions perpendicular to the additive manufacturing direction. Although generally both vernier patterns may be formed identically, embodiments are also intended to include the form where a grid is combined with one or more line scales. Advantageously, the vernier patterns are superimposed or contiguous.

Optionally, the at least one vernier scale comprises at least one first side scale on a side surface of the first substructure, and at least one second side scale on a side surface of the second substructure, wherein both side surfaces form a lateral boundary of the structure after completion. The vernier scales may be formed here by two adjacent line scales.

Optionally, the at least one vernier scale comprises: a first vertical vernier scale formed periodically in the fabrication direction, and a second vertical vernier scale on a component of the apparatus for additive manufacturing, in order to determine a vertical offset of the first substructure and/or the second substructure.

Optionally, the substructures comprise a transparent material at least at a position (region) of the position marker, in order to enable optical detection by means of an optical sensor (e.g., a camera). The offset can also be detected by a user by visual inspection.

Optionally, the substructures comprise a dielectric material at least at a position (or region) of the position marker, and the position marker (e.g., vernier pattern) comprises an electrically conductive material, in order to enable electrical detection of the offset. Electrical sensing may be provided by electrical resistance (if direct contact is present), capacitance (if no direct contact is present), or by measured inductance. Optionally, the position marker is a linear encoder that capacitively measures a linear displacement.

Optionally, the position marker is a first position marker and the structure further comprises a second vernier-based position marker spaced apart from the first position marker. The first and second position markers may have the same structure, and are formed as far apart as possible (e.g., on opposite sides). This can increase accuracy, especially in the case of twists (rotations).

Embodiments also relate to an apparatus for additive manufacturing of a structure as previously described and having a first vernier pattern. The apparatus comprises: a component having a second vernier pattern configured to form, together with the first vernier pattern, a vernier position marker to indicate a relative offset between the component and the structure. For example, the component may be the printhead, or may be attached to the device near the printhead. However, the component may also be located elsewhere (e.g., on a fixture).

Embodiments also relate to a method for an additive manufacturing of a structure using an additive manufacturing apparatus. The method comprises:

Providing a first substructure with a first vernier pattern;
Equipping the first substructure with an electronic component;
Additively fabricating a second substructure, wherein a second vernier pattern is fabricated on the second substructure or formed on the additive manufacturing device,
Indicating a relative offset between the first substructure and the second substructure by a position marker formed from the first vernier pattern and the second vernier pattern.

Optionally, providing a first substructure comprises: additively manufacturing the first substructure along with the first vernier pattern. Equipping the first substructure may comprise: Removing the additively fabricated first substructure from an additive manufacturing apparatus; equipping the first substructure with the electronic component; and reinserting the first substructure along with the electronic component into the additive manufacturing apparatus.

Optionally, the method comprises determining an offset using the position marker. The determining may be performed optically by means of an optical sensor or a camera, and may comprise a transillumination or a laser scan. The determining may also, or additionally, be performed by means of electrical signals, i.e., via measurement of resistance, a capacitance, a resonance, inductance, etc.

Optionally, the additive manufacturing of the second substructure is finished only after the determining of the offset. If a threshold value is exceeded, a correction can be made.

Embodiments solve at least part of the problems mentioned at the beginning by using a position marker based on the vernier principle, for which purpose two patterns are introduced into both substructures. A vernier allows a much more precise determination of position deviations than would be possible by looking at two simple markers lying on top of each other.

The structure is, for example, an additively manufactured circuit carrier (e.g. a printed circuit board). According to embodiments, the printing process may be interrupted to add e.g. electronic components, and is continued precisely at the same location. Embodiments also allow a quality assurance process to verify the precision of the continued printing.

BRIEF DESCRIPTION OF THE FIGURES

The embodiments of the present invention will be better understood by reference to the following detailed description and by the accompanying drawings of the various embodiments, which, however, should not be construed as limiting the disclosure to the specific embodiments, but are for explanation and understanding only.

DETAILED DESCRIPTION

Figure 1:
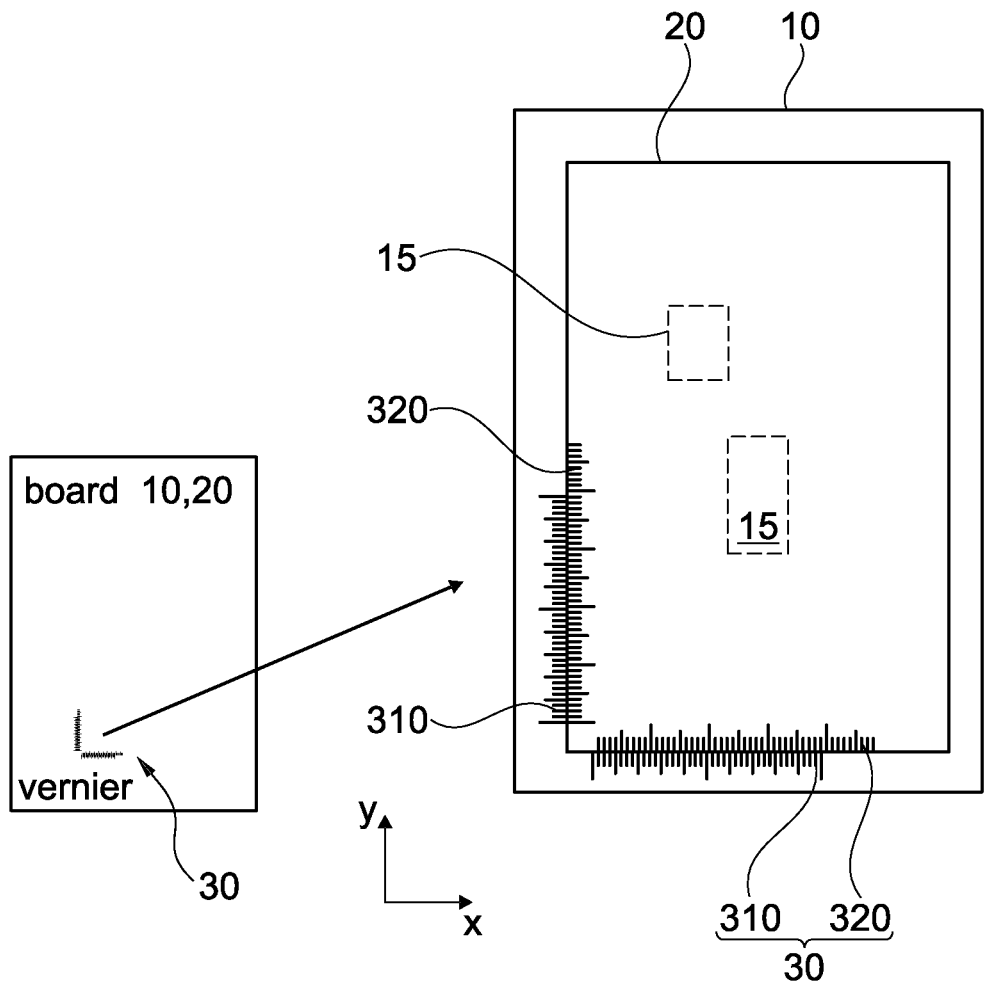
FIG. 1 shows a schematic view of an additively manufactured structure according to an embodiment of the present invention.

FIG. 1 shows a schematic view of an additively manufactured structure according to one embodiment, the structure comprising a plurality of substructures 10, 20, at least one electronic component 15, and a vernier-based position marker 30. The substructures 10, 20 comprise a first substructure 10 on which a second substructure 20 has been additively manufactured such that the electronic component 15 is embedded in the two substructures 10, 20.

For example, the electronic component 15 may be mounted or installed on the first substructure 10, or also on the second substructure 15. Typically, this is also done in an apparatus used for additive manufacturing (e.g. in an assembly machine).

The vernier-based position marker 30 is configured to detect a relative offset, wherein the offset may include at least one of the following: a displacement along a first horizontal direction X and/or a second horizontal direction Y, a twist about a vertical axis Z (additive manufacturing direction). By way of example, the position marker 30 includes a first vernier pattern 310 on the first substructure 10 and a second vernier pattern 320 on the second substructure 20.

In this embodiment, the first and second vernier patterns 310, 320 each comprise, by way of example, a line scale having different line spacings, so that a displacement of the first substructure 10 relative to the second substructure 20 can be detected. For example, if the first lines of the line scales 310, 320 match, there is no offset, but if other lines of the two line scales 310, 320 match, there is a corresponding offset, depending on which of the lines shown match each other (vernier principle).

In FIG. 1, two sets of vernier patterns 310, 320 are shown to detect an offset in both the X-direction and the Y-direction. In further embodiments, the position marker 30 shown is a first position marker, and a second position marker may be formed at a more distant position. This provides better accuracy, particularly with respect to twists. In order to detect such angular deviations as accurately as possible, the second position marker may be an identical marker and may preferably be formed at a large distance on the exemplary board.

Thus, FIG. 1 shows a simple embodiment where the position marker 30 comprises two superimposed vernier crosses 310, 320 with different grid spacings.

The line scales 310, 320 can also be arranged one above the other, in which case a (nearly) transparent material at the position of the position marker 30 can be used to detect the offset, or an electrical detection is performed (see below). This would also facilitate the detection of the twist.

To minimize parallax error, the first vernier pattern 310 may be placed near or on the upper surface of the lower, first substructure 10. The second vernier pattern 320 is then attached to a lower surface of the upper, second substructure 20. Thus, by looking at the perpendicular from above, i.e., on the XY plane, a precise verification of the positional deviation can be determined (e.g., using a camera system or the naked eye).

If the dielectric (the non-conductive part of the structure, board) has a transparent material, this control can be determined during the printing process. If the material is opaque, the control can also be done afterwards.

Figure 2A:
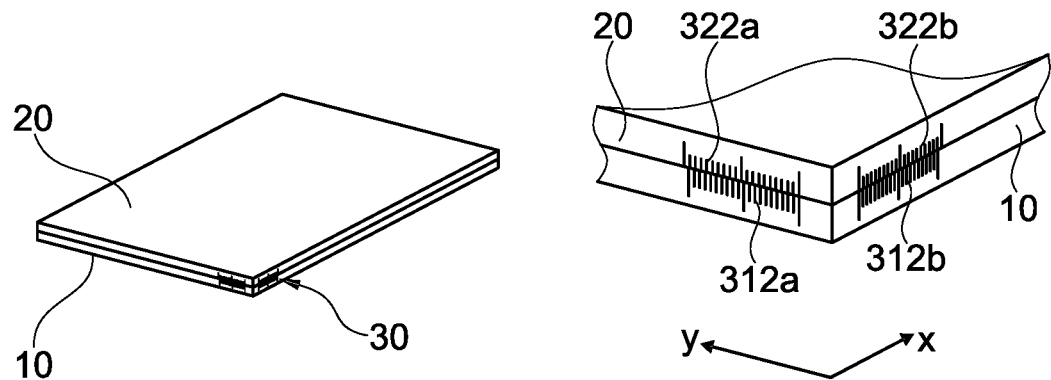
FIGS. 2A-2C show further embodiments for opaque structures and for 2-dimensional position determination.

FIG. 2A illustrates another embodiment that is particularly suitable for nontransparent (opaque) structures. Here, the position marker 30 includes vernier patterns 310, 320 on a side surface of the first substructure 10 and the second substructure 20, the side surfaces providing a lateral boundary (in the X or Y direction) of the structure after completion of the structure.

The position marker 30 is visible here even after completion of the additively manufactured structure, the position marker 30 exhibiting an exemplary first vernier scale 312*a* along the exemplary Y direction and a first vernier scale 312*b* along the X direction on the first substructure 10. Similarly, a second vernier scale 312*a*, 312*b* is formed along the X and Y directions on the second substructure 20. The first and second vernier scales 312*a*, 322*a* in the Y direction form a Y vernier for detecting an offset in the Y direction. The first and second vernier scales 312*a*, 322*a* in the X direction form an X vernier for detecting an offset in the X direction. Further position markers may be provided on other side surfaces.

In addition to being suitable for non-transparent material, no board space is consumed for this position marker. Furthermore, vernier patterns 310, 320 can be formed on several or all side surfaces, so that twists can also be detected very accurately.

For automated monitoring, a more advanced form of the simple position marker 30 is suitable. Here, instead of a scale, a cross pattern in the form of a grid is used, which can also be referred to as a vernier grid, wherein the grid spacing or mesh widths are specifically set in order to achieve a desired resolution. These grids are suitable for performing automated image evaluation (e.g. with a camera), looking for a bright area or a dark frame surrounding the bright area, in order to determine the deviation.

Figure 2B:
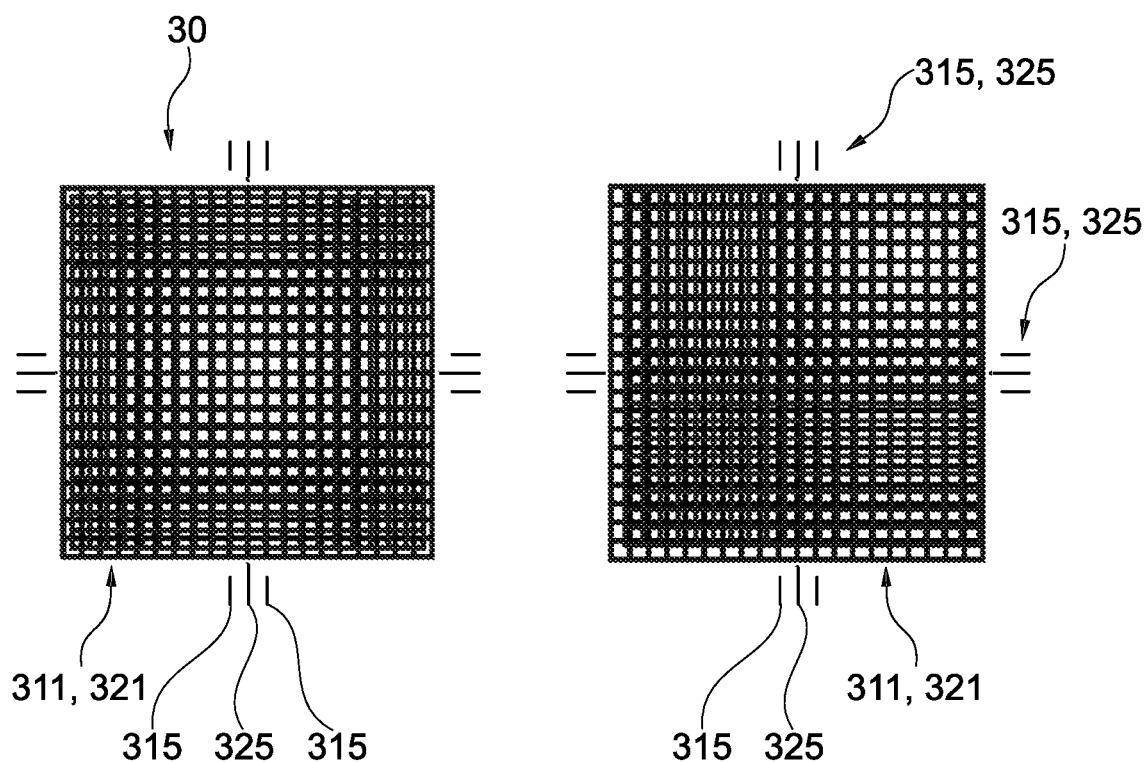

FIG. 2B shows an embodiment for such a position marker 30, wherein a first grid 311 is formed on the first substructure 10 and a second grid 321 is formed on the second substructure 20. As with the line scales 312, 322, the grid spacings are not identical, but are slightly scaled so that a relative offset between the two grids 311, 321 is visible when superimposed. It need not be a rectangular grid either. It may be triangular or honeycomb (hexagonal).

On the left side in FIG. 2B, a central coincidence of the two gratings can be seen, while on the right side a shift of the second substructure 20 to the lower left can be seen. In case of perfect coincidence of the two gratings (position difference equal to zero), the bright region can be located exactly in the center of the grating. In case of a deviation, this bright area shifts to one of the two edges depending on the proportional deviation in X and Y direction.

The grid patterns 311, 321 each further include an outer marker 315, 325, which can be used to determine whether the grids 311, 321 are offset from each other by more than one grid period. For example, if the center line 325 is outside the area given by the lines 315, there is an offset of a multiple of the grid spacing. To this end, the spacing of the two lines 315 is just twice the period of the associated grid 311, 321. The center line 325 may e.g. be associated with the second grid 321, while the two lines 315 may be associated with the first grid 311. For example, their spacing may then be twice the grid spacing of the first grid 311. However, the assignment may also be in the exact opposite way.

Figure 2C:
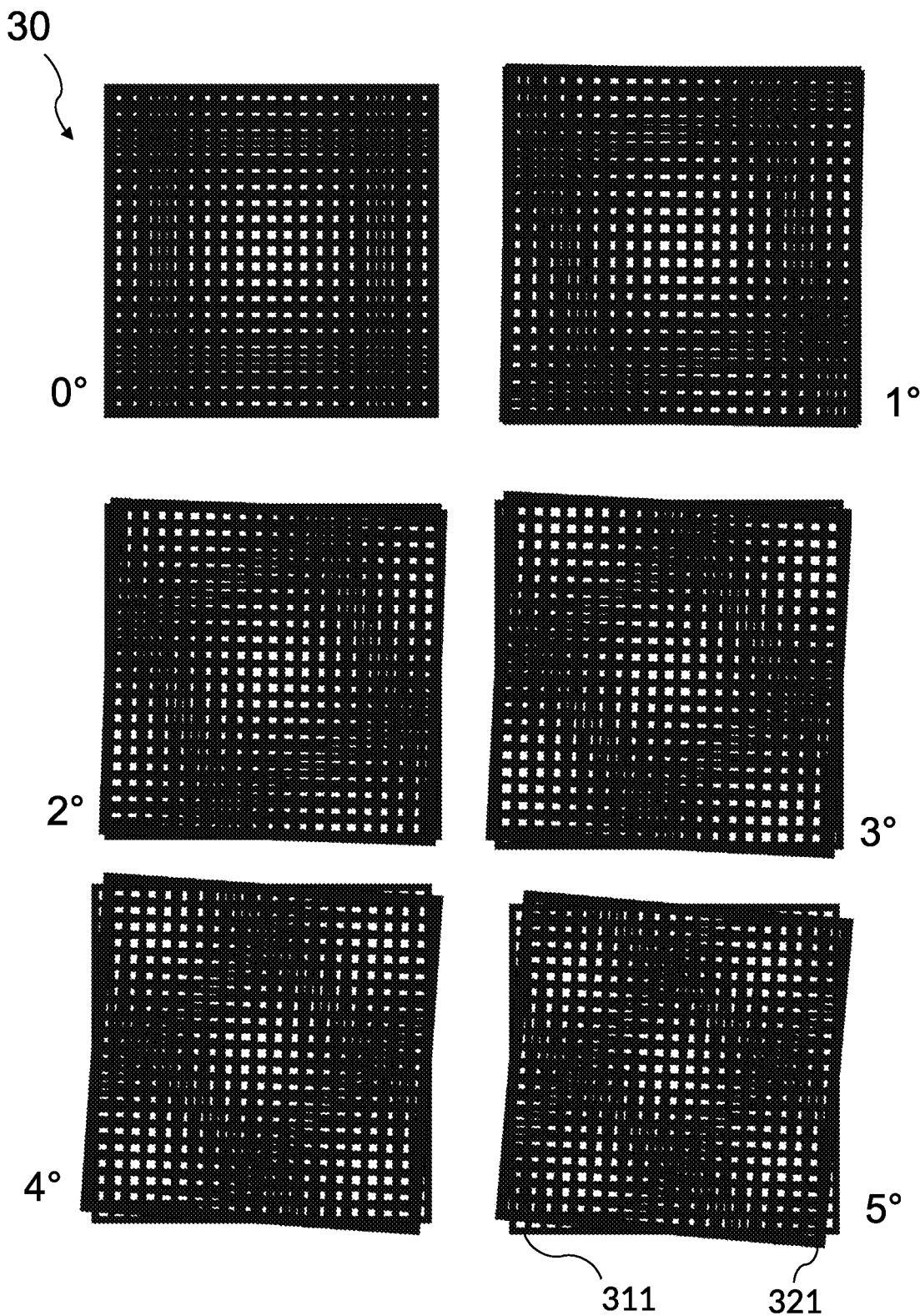

FIG. 2C shows an example of the relative twists of the exemplary grating patterns 311, 312 from 0° to 5°. The changes in the superimposed grating patterns thus also allow relative twists to be determined. This does not result in a pure shift of the brightness distribution. Due to the Moiré effect, additional local intensity maxima are created, from whose arrangement a relative twist angle can be read off. From the positions (e.g. of the center) of these additional intensity maxima, the relative angle of twist can be read off. This relation may be calculated, or simply determined by a calibration for a concrete pattern. In addition to evaluating the positions and angles of the individual intensity maxima, it is also possible to evaluate the angle of the connecting lines of intensity maxima relative to the edge to a reference plane (for example marker, basic structure or printer).

The size of the exemplary vernier grating 311, 321 may be selected to allow for optical inspection or analysis by eye. For example, they may have a size of 10×10 mm. According to embodiments, the vernier pattern 310, 320 can be used to detect deviations in the X and Y directions of at least +/−0.5 mm. However, further embodiments allow for a much better resolution. For example, measurement accuracies of +/−0.05 mm can be achieved, and deviations in both directions can be detected. For example, the grid spacing (or mesh size) of the vernier grid can have a value of 1/10 mm (100 μm), and of the narrower mesh vernier grid of 1/9 mm (111 μm).

However, the size of the grid and the grid spacing may be freely selected or set depending on an expected deviation.

The following dimensions have proven to be advantageous when viewed by eye:

Grid size: 10 mm
Line count: 20
Grid spacing: small 500 µm
Grid spacing: large 525 µm
Line width: 0.15 mm These parameters represent only one possible embodiment. In particular, other dimensions may be selected for automated detection of the offset by means of an optical sensor (e.g. a camera), which depend, for example, on the sensor (e.g. resolution of the camera).

Figure 3:
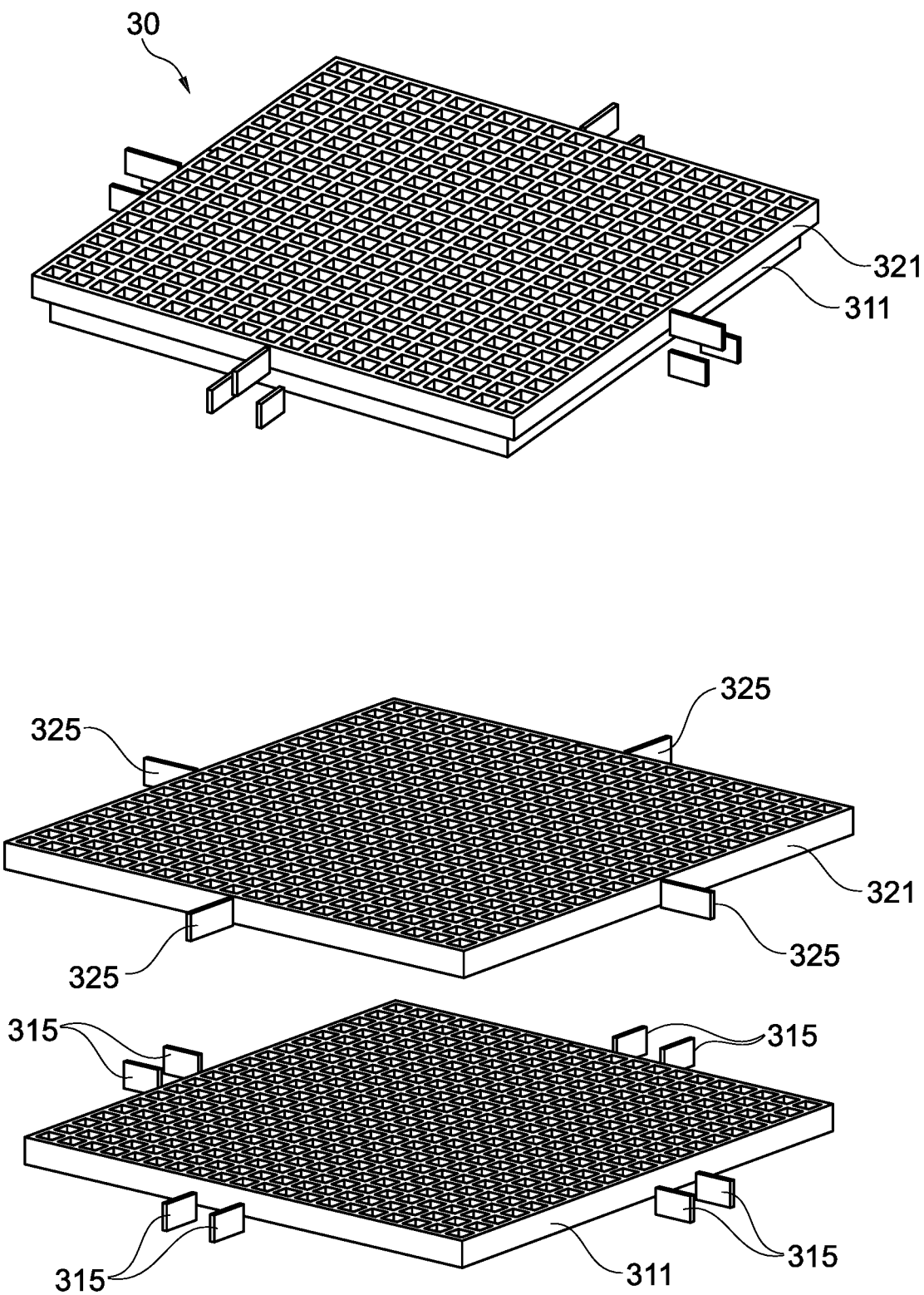
FIG. 3 shows a more detailed illustration of a vernier grid according to further embodiments.

FIG. 3 shows a spatial view of vernier grids 311, 321 as they may be used according to embodiments. In FIG. 3 below, the first vernier grid 311 is first shown as it may be exemplarily formed on the first substructure 10. The first vernier grid 311 again includes the range markers 315 as outer markers configured to detect an offset larger than a grid period of the first substructure 10 relative to the second substructure 20. The second vernier grid 321 also comprises a rectangular grid pattern, but with a slightly different grid spacing, so that a slight offset can be detected according to the vernier principle. In addition, the second vernier grid 321 comprises a plurality of line markers 325 as outer markers, which are arranged as centrally as possible within the area of the range marker 315 when the first substructure 10 is positioned accurately relative to the second substructure 20. FIG. 3 above shows a spatial view of the two superimposed vernier grids 311, 321. The top view then shows, for example, the pattern displayed in FIG. 2B.

As already explained, the detection of the offset can also be done automatically, for example by a camera. In FIG. 2B, for example, the bright translucent area can be detected as an area of high light intensity by the camera. An evaluation unit may also determine whether the bright region (=maximum intensity) is located in the center or shifted. Large shifts can also be detected by the camera via control marks 315, 325 on the outer sides. For this purpose, the camera may be designed to detect the brightness distribution on the image. When there is a displacement of the first substructure 10 relative to the second substructure 20, the maximum of transparency is not where it would be expected to be if the positioning was accurate (e.g., centered), but is relatively shifted in a direction indicating the offset of the two substructures 10, 20.

Figure 4:
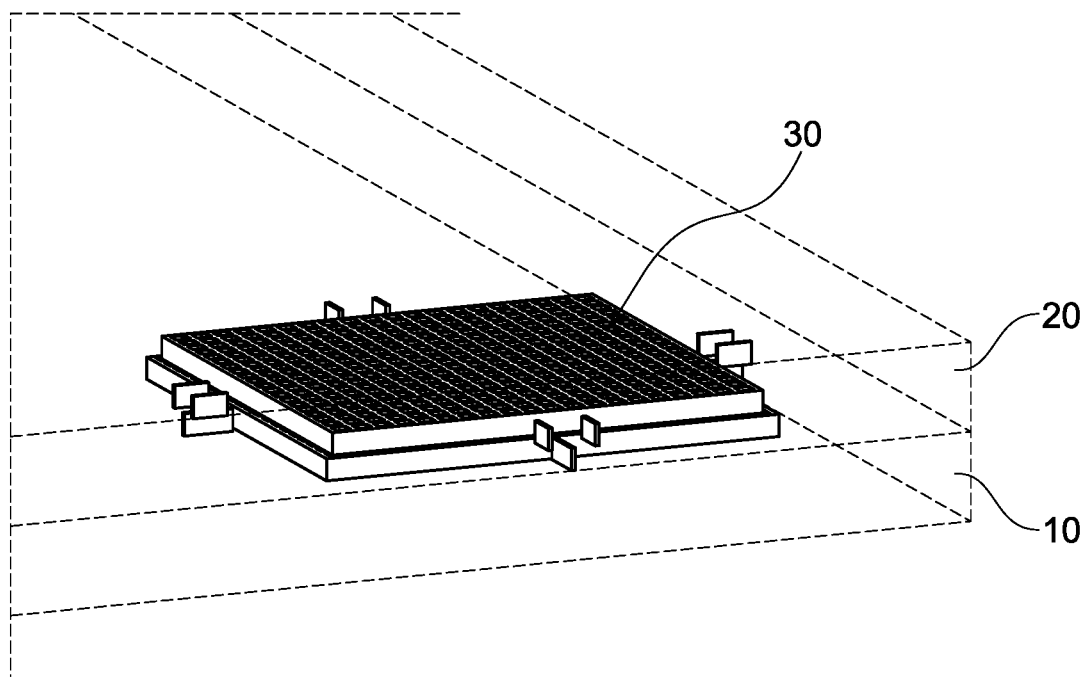
FIG. 4 shows a possible arrangement of the vernier grids in the substructures.
Figure 4:
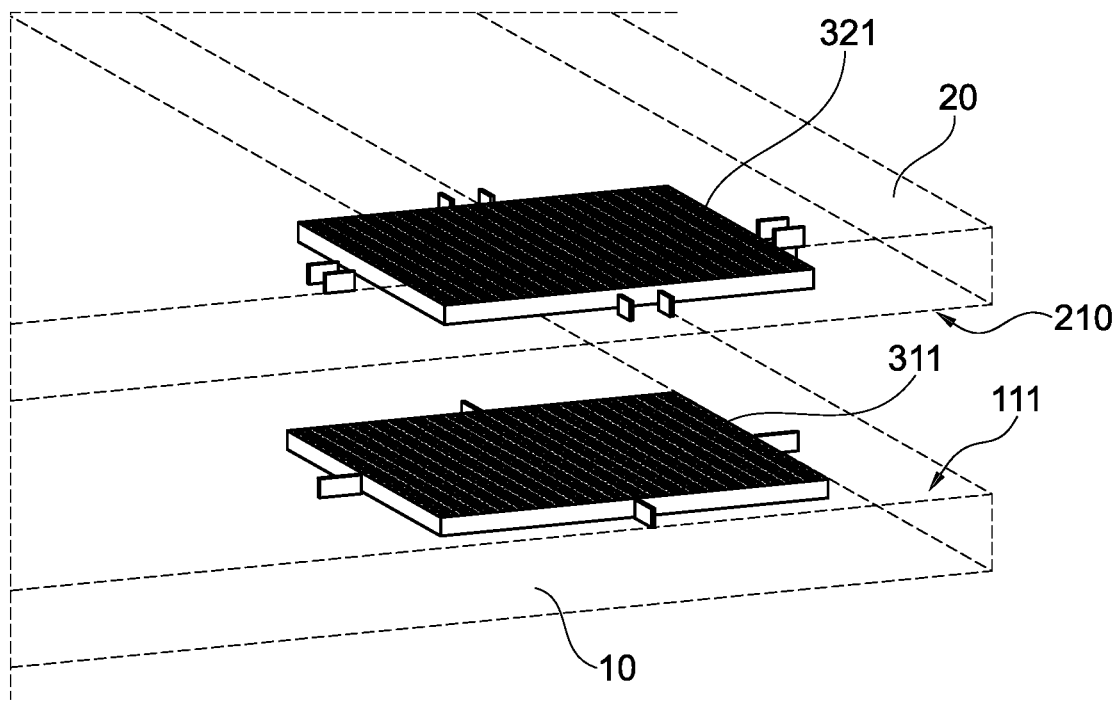

FIG. 4 shows a possible arrangement of the vernier grids 311, 321 of FIG. 3 in the first substructure 10 and in the second substructure 20, respectively. At the bottom of FIG. 4, the first substructure 10 has been displaced from the second substructure 20 to better illustrate their respective arrangements. It is understood that the second substructure 20 is additively manufactured on the first substructure 10, so that they are generally not separable.

For example, in additive manufacturing, the first vernier grid 311 is formed on a top surface 110 of the first substructure 10 and the second vernier grid 321 is formed on a bottom surface 210 of the second substructure 20, wherein terms such as "top" and "bottom" may be defined by the manufacturing direction. This allows the first vernier grid 311 and the second vernier grid 321 to be as close to each other as possible, so that parallax errors can be minimized. According to further embodiments, this is also done for the vernier scales in FIG. 1 and FIG. 2A, respectively. Also there, it is possible to form the vernier scales 312, 322 each on a top side of the first substructure 10 and bottom side of the second substructure 20, respectively, in order to minimize a parallax error.

In FIG. 4 above, the completed structure is shown with the first substructure 10 fabricated below the second substructure 20 and the two vernier grids 311, 321 adjacent to each other.

However, the position deviation does not only have to be read out via optical measuring methods. It can also be done via electrical detection.

Figure 5:
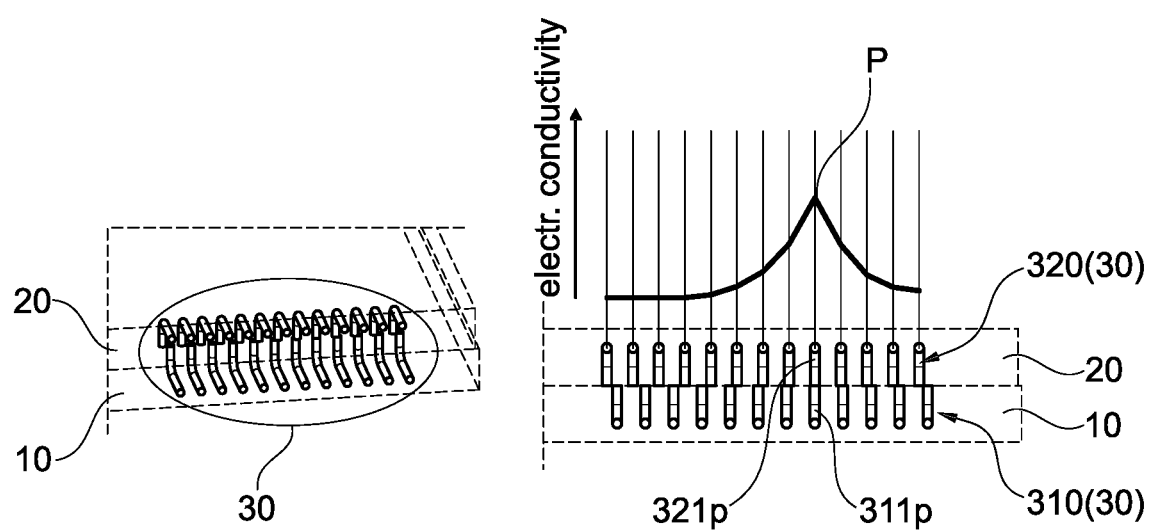
FIG. 5 shows an embodiment for an electrical readout of the position accuracy.

FIG. 5 shows a corresponding embodiment, in which the detection of the offset is not performed optically by detecting a pattern offset, but via an electrical measurement. For example, it is possible that the grids 311, 321 or the line scales 312, 322 are implemented by electrically conductive elements. Depending on how much they overlap each other, an electrical resistance or a capacitance for a transmitted signal changes. Thus, a maximum of the electric current flow (=minimum of the electric resistance) will be exactly where individual elements of the exemplary vernier scales 312, 322 are maximally aligned (maximally overlapping). This is the case in FIG. 4 (see right side) at position P. There, the line elements 311p, 322p are aligned along a line.

The position of this maximum conductivity can be determined by an electronic circuit and indicates the degree to which the second substructure 20 is offset from the first substructure 10. Depending on how the position marker 30 is calibrated, an alignment at a particular line (e.g., the center) may indicate accurate positioning, while each line on either side may indicate increasing offset.

It is also possible that not the electrical resistance is measured, but a capacitive or inductive measurement is made. In general, an impedance can be measured, whereby smallest changes can be measured e.g. by means of a shift of a resonance frequency.

Contact can be made via an outer wall (e.g., end surface in FIG. 5), and the vernier patterns 310, 320 are contacted via electrically conductive tracks that establish electrical connections to the outer wall. The outer wall in this case may be a lateral surface as well as an upper and lower surface. Thus, a mapping is carried out over all contact points. The maximum conductivity can then be determined automatically. Similar to the visual inspection of vernier lines/grids, the position of the maximum represents the relative offset. It is understood that with such a measurement, offsets in both horizontal directions X, Y are possible, since offsets in both directions result in a change in the overlap. To increase accuracy, a dot pattern can be formed in both directions, with scaling in both directions to achieve the vernier effect.

According to further embodiments, at least one vernier pattern 310, 320 is not integrated into the structure to be manufactured, but is formed as a separate object to allow monitoring of the entire print job (possibly for multiple boards). For example, one of the two vernier patterns 310, 320 may not be formed in the first or in the second substructure 10, 20, but is present on the apparatus for additive manufacturing. Thus the first vernier pattern 310 may e.g. first be formed on the first substructure 10 (e.g., on a side surface). Then, the first substructure 10 may be removed from the manufacturing device to attach the electronic component 15. After inserting the first substructure 10 together with the electronic component 15 into the additive manufacturing apparatus, a vernier pattern 320 on the print head of the manufacturing device, for example, may be used to determine whether the orientation relative to the printing device is still as desired, or whether a correction is advised to additively manufacture the second substructure 20 on the first substructure 10 with high accuracy.

A separate calibration scale can also be provided on the additive manufacturing device for this purpose, which is suitable for repeated position measurements. If, for example, three or more substructures are to be manufactured one above the other, with electrical components being inserted between the respective substructures by means of a pick-and-place machine, an offset can be detected by the existing position marker 30 each time the substructures are reinserted in the additive manufacturing apparatus.

Figure 6:
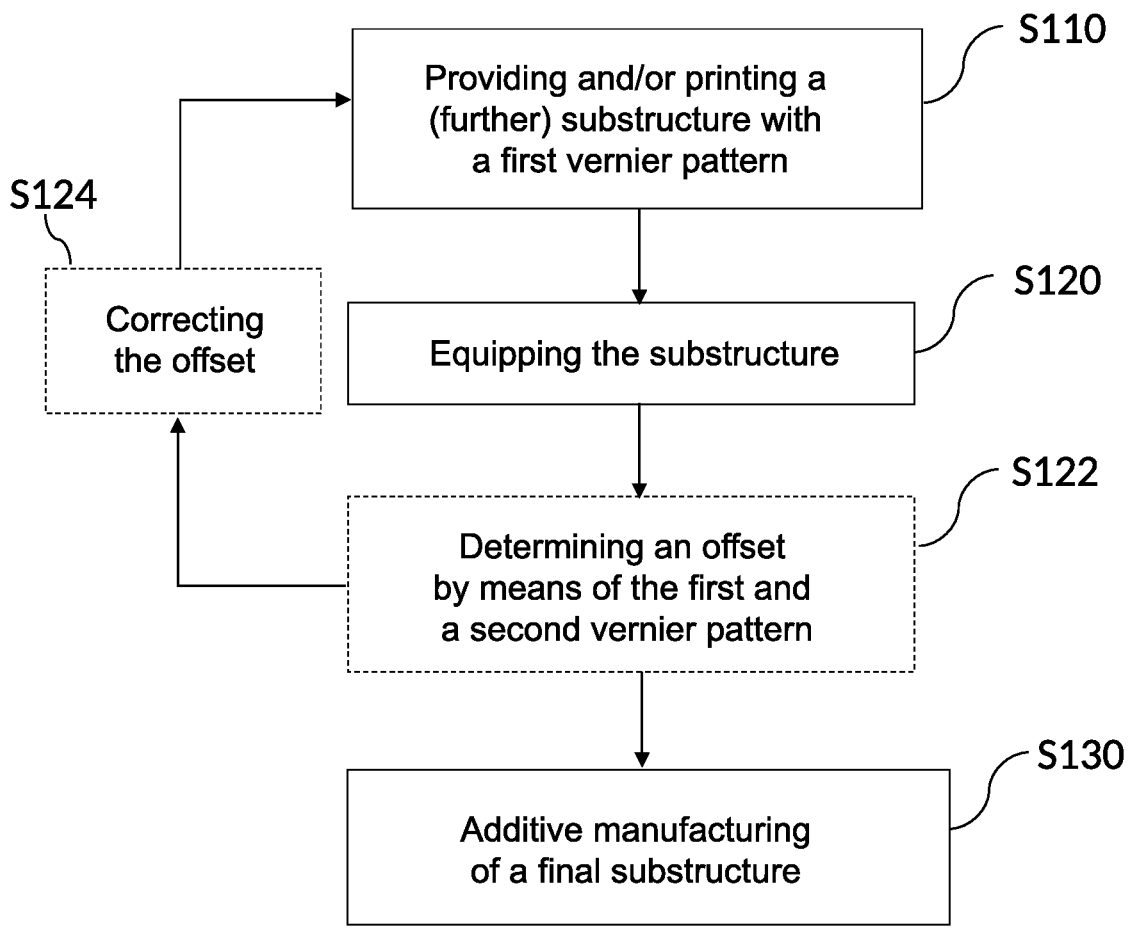
FIG. 6 shows a schematic flow diagram for a process according to embodiments.

FIG. 6 shows a schematic flow diagram for manufacturing a structure. The fabricated structure may be, in particular, a circuit carrier or a printed circuit board, forming, for example, part of a 3D electronic system. The process comprises the steps:

Providing S110 a substructure with a first vernier pattern, wherein the providing may in particular comprise additive manufacturing;
 Equipping S120 the substructure with an electronic component;
 Additive manufacturing S130 of a final (or a second) substructure.

A second vernier pattern is fabricated on the last substructure, or is already present on the additive manufacturing apparatus. The first vernier pattern and the second vernier pattern form the position marker to indicate a relative offset between the substructures.

Optionally, the method further comprises:
 Determining S122 an offset using the position marker,
 Correcting S124 the determined offset.

Then the process may be continued with the fabrication (printing) of another substructure, wherein a correction is made while passing through each loop. In the simplest case, only a first substructure 10 is manufactured/prepared, on which a second substructure 20 is printed.

In particular, in the step of additive manufacturing the first substructure 10, the first substructure 10 is manufactured together with the first vernier pattern 310 in or on the first substructure 10. The first substructure 10 may also be, or include, a conventionally fabricated circuit board (which may be unpopulated, partially populated, or fully populated) into which the first vernier pattern 310 has been introduced in a conventional fabrication process. For example, the conventionally manufactured circuit carrier may be a circuit board made of e.g. FR4 (epoxy resin and fiberglass), polymer, or ceramic.

As already described, according to further embodiments the manufacturing of the second substructure 20 on the first substructure 10 may not take place immediately. The first substructure 10 may be removed from the manufacturing device for fitting with the electronic component 15. After reinsertion, a possible offset may first be detected, and a correction of the detected offset may be made before further printing. Specifically, after the equipping with the electronic component 15, the portion of the second substructure 20 having the second vernier pattern 320 can first be manufactured on the first substructure 10. Then, the relative misalignment is determined. Then, the optional correction of the print orientations or offset is performed. Finally, the second substructure 20 is finished. This readjustment before completion of the print job offers the advantage that insufficient vias due to the detected deviations in position can be avoided.

The equipping with the at least one electronic component on the first substructure 10 is generally performed outside the 3D printer. However, it can also take place inside the 3D printer. In both cases, interruptions of the printing process lead, among other things, to thermal fluctuations and thus to abrupt position deviations. Positioning according to embodiment examples using the position marker 30 can also be used accordingly to calibrate subsequent processes (e.g., pick & place assemblies). The determination of the position offset can also take place immediately before further printing of the second substructure 20, in order to e.g. minimize further thermally induced position deviations.

The so far mentioned measurement methods for determining the position offset may be implemented concretely as follows:

A. Optical Measurement Method

Printing of the second vernier pattern 320 on the first vernier pattern 310. In order to exclude collisions of the print head with the workpiece, the distance of the lowest point of the print head to the printing surface may be selected significantly larger than a layer thickness of the printing process. For this purpose, a height offset of the printhead is taken into account, according to embodiments. After that, the position offset can be detected optically.

B. Electronic Measuring Method

The different electrical resistances resulting from different overlaps may be measured electrically directly. In addition, capacitance/inductance measurements may also be made. For this purpose, a measuring device for capacitive or inductive detection of the measurement deviation may be attached to the print head, preferably in the vicinity of the print nozzles. Capacitive and inductive measuring methods are known to those skilled in the art (e.g. for calipers), and their accuracy is +/−0.02 mm=+/−20 μm. This accuracy results in a measuring accuracy at the level of a printer resolution of known 3D printers in a range of 600 dpi (25.4 mm/600=42.3 μm). Since the measurement accuracy is thus in the range of one pixel width, the measurement method is sufficiently precise. In order to use as little installation space as possible, the electrical conductors of the position marker 30 may be mounted in the vicinity of a side surface of the exemplary circuit carrier. Two measuring systems, preferably arranged at right angles to one another, may be provided for detecting the position deviation in the X and Y directions.

According to embodiments, the measured value (offset) can be recorded by means of a linear encoder. For a low power requirement, the linear encoder may operate capacitively and, to a lesser extent, inductively. For a capacitive detection, a periodically arranged pattern (e.g. first vernier pattern 310) in the form of an electrical conductor track may be used, which forms plates of capacitors. By means of oppositely arranged metal strips (e.g. second vernier pattern 320), a signal is generated with several different pulse-width modulated square-wave signals, which are formed by the control electronics. Depending on the relative position of the patterns formed in this way, the different capacitive couplings of the geometric arrangement result in different signal characteristics at the receiving electrode. By means of digital signal processing, the exact relative position of the first vernier pattern 310 and the second vernier pattern 320 can be determined and output.

There are various procedures and implementation types for the methods and linear encoders used. Besides according to the physical principle (capacitive and inductive), the employed linear encoders may be roughly divided into relative and absolute encoders. For relative linear encoders, an adjustment of the zero point (calibration) takes place before a measurement. The offset is then determined relative to this zero point by a counter in the electronics. Very little energy is consumed in this case by the electronics, e.g. by a CMOS circuit technology, so that no negative effects on the other electronic components 15 on the circuit board are to be expected. In the case of absolute linear encoders, the position information is fixed in the way in which the encoder is structured, and zero adjustment is not necessary. According to further embodiments, the employed linear encoders may have a serial data interface, which may be implemented as an RS-232 interface that allows automatic tapping of the offset for external storage or display on larger, external displays.

Once the position offset has been determined, printing can continue with optimized position parameters. For this purpose, determined offset parameters may be introduced into the printing process so that the position deviation is corrected and the risk of misprints is thus reduced.

Thus, the position marker 30 is not only used to determine the position offset during 3D printing. Rather, the determined position deviation, caused by the interruption of the printing process, is also to be corrected before further printing. This allows not only a good/bad check afterwards, but also an active increase of the job-on-job precision.

According to further embodiments, the position marker 30 or its position may be encoded in a further marker to simplify the finding of the marker. The further marker may enable an automatic detection similar to a QR code, wherein the encoded information will automatically guide the device towards the position of the position marker 30.

The features of the invention disclosed in the description, the claims and the figures may be essential to the realization of the invention either individually or in any combination.

LIST OF REFERENCE SIGNS 10 first additively manufactured substructure
110 top side of first substructure
15 at least one electronic component
20 second additively manufactured substructure
210 bottom side of the second substructure
30 vernier-based position marker
310,320 vernier pattern
311,321 vernier grating
312,322 vernier scale
315,325 outer marker
Z (vertical) manufacturing direction
X,Y (horizontal) directions perpendicular to the manufacturing direction

What is claimed is:

1. A structure including:
a plurality of substructures comprising a first substructure, a second substructure, and at least one electronic component, wherein the first substructure includes a first vernier pattern having a first periodicity, and the second substructure includes a second vernier pattern having a second periodicity that is different than the first periodicity in at least one direction, the first vernier pattern and the second vernier pattern being positioned relative to one another to form a vernier-based position marker; the vernier-based position marker indicating a relative offset between the first substructure and the second substructure;
wherein the first substructure and the second substructure are comprised of a dielectric material that forms a non-conductive part of the structure where the position marker is provided, the first vernier pattern and the second vernier pattern comprise electrically conductive elements, and the vernier-based position marker being electrically conductive; and
wherein the first vernier pattern and the second vernier pattern each comprise at least one vernier scale to indicate the relative offset in one or both directions (X,Y) perpendicular to an additive manufacturing direction (Z), wherein the at least one vernier scale comprises at least one first side scale on a side surface of the first substructure and at least one second side scale on a side surface of the second substructure, to form at least a portion of the position marker along a lateral boundary of the structure in the X or Y direction, the first vernier pattern being embedded in the first substructure and the second vernier pattern being embedded in the second substructure, wherein the first vernier pattern and the second vernier pattern are in direct contact with each other.

2. The structure of claim 1, wherein the first vernier pattern is formed on a top surface of the first substructure and the second vernier pattern is formed on a bottom surface of the second substructure, wherein the bottom surface and the top surface are facing each other.

3. A structure, including:
a plurality of substructures comprising a first substructure and a second substructure holding at least one electronic component, wherein the second substructure is at least partially additively manufactured on the first substructure; and a vernier-based position marker configured to indicate a relative offset between the first substructure and the second substructure, wherein the position marker comprises a first vernier pattern and a second vernier pattern, wherein the first vernier pattern is formed on the first substructure and the second vernier pattern is formed on the second substructure or on a component of an apparatus for additive manufacturing, wherein the first vernier pattern and the second vernier pattern each comprise a grid to indicate an offset in one or both directions (X,Y) perpendicular to an additive manufacturing direction (Z), wherein the offset is read off from intensity maxima created by the Moiré effect, and, wherein each grid further includes an outer marker to determine whether the grids are offset from each other by more than one grid period.

4. The structure of claim 3, wherein the at least one vernier scale comprises:
a first vertical vernier scale formed periodically in the additive manufacturing direction (Z), and a second vertical vernier scale formed on a part of an apparatus for additive manufacturing for detecting a vertical offset of the first substructure and/or the second substructure.

5. The structure of claim 3, wherein the substructures comprise a transparent material at least at a position of the position marker to enable optical detection by means of an optical sensor.

6. The structure of claim 1, wherein the position marker is structured such that electrical contacts between the first vernier pattern and the second vernier pattern are made via an outer wall of each the first substructure and the second substructure, wherein the electrical current flows at positions where the first vernier pattern and second vernier pattern are in direct contact with one another.

7. The structure of claim 6, wherein the position marker comprises a linear encoder.

8. The structure of claim 1, wherein the position marker is a first position marker and the structure additionally comprises a second vernier-based position marker spaced apart from the first position marker to increase measurement accuracy or detect a twist.

* * * * *